United States Patent [19]

Bauer

[11] Patent Number: 5,703,297

[45] Date of Patent: Dec. 30, 1997

[54] SYSTEM FOR DETERMINING THE EXIT DIRECTION OF A FLEXIBLE SUPPLY LINE FROM AN AUTONOMOUS MOBILE UNIT

[75] Inventor: Rudolf Bauer, Neubiberg, Germany

[73] Assignee: Siemens Aktiengesellschaft, Munich, Germany

[21] Appl. No.: 683,226

[22] Filed: Jul. 18, 1996

[30] Foreign Application Priority Data

Jul. 18, 1995 [DE] Germany .................. 195 26 185.2

[51] Int. Cl.⁶ .................. G01L 7/00; E03B 1/00
[52] U.S. Cl. .................. 73/756
[58] Field of Search .................. 73/756, 862.56, 73/158, 862, 627; 137/493, 596

[56] References Cited

FOREIGN PATENT DOCUMENTS 40 11 260  10/1991  Germany .

OTHER PUBLICATIONS

R. Rohde, "Druck- Und Positionssensoren für Tastaturen", Feinwerktechnik & Messtechnik 99 (1991), pp. 339–341. (No Translation).

Primary Examiner—Ronald L. Biegel
Assistant Examiner—William L. Oen
Attorney, Agent, or Firm—Hill, Steadman & Simpson

[57] ABSTRACT

A system is provided for sensing an exit direction of a flexible supply line relative to an apparatus, such as robot or autonomous mobile unit. A method is also provided for planning the movement of such a unit based partly on such supply line direction data. The system includes a pressure sensor a least partially disposed around an exit opening through which the supply line is feedably guided. Upon contact at a given point on the sensor from the supply line, the sensor emits a signal corresponding to a particular exit direction. From this signal, a probable exit direction is inferred and a more precise movement planning is enabled, avoiding measurement errors that arise when the cable is run over can be avoided, or avoiding knottings of the cable.

20 Claims, 2 Drawing Sheets

SYSTEM FOR DETERMINING THE EXIT DIRECTION OF A FLEXIBLE SUPPLY LINE FROM AN AUTONOMOUS MOBILE UNIT

BACKGROUND OF THE INVENTION

The present invention relates to a system that enables the determination of the direction in which supply lines, such as air hoses or power cables, exit from an apparatus. This arrangement is particularly advantageous with supply lines of autonomous mobile units, for example, small robots and transport vehicles. Supply line direction data helps an autonomous mobile unit generate its travel plan to avoid running over or knotting its supply line.

Technological advances in electronics and mechanical areas have led to dramatic drops in prices in complex electronic components, such as control means or integrated personal computers. Also, intensive research in the field of orientation methods for robots or autonomous mobile units have advanced technology in sensor data evaluation and avoidance and reduction of errors in the orientation of such robots or autonomous mobile units. These advances have led recently to improved practicable orientation methods by which such units can move in complex environments blocked by obstacles. Under these conditions, the use of autonomous mobile units in office environments as personal robots, industrial transport vehicles or postal distribution vehicles is becoming increasingly more practical and useful. Unfortunately, in this context accumulator technology has not been able to keep up with the progress made in the other areas, so that energy-intensive activities, such as for example cleaning with vacuum cleaners or transporting heavy loads, cannot be realized at a reasonable duration of usable time with the use of accumulators as energy sources in autonomous mobile units.

For such activities, it more practical, and sometimes necessary, to operate these units quasi-autonomously, i.e., with air or electrical supply lines connected to a fixed supply point. In such applications, however, a problem arises in that the autonomous mobile unit must account for the supply cable lying around it, so that it is not restricted or hindered in its movement by this supply line.

Since autonomous mobile units often orient themselves with sensors, e.g., ultrasound sensors and wheel-revolution-dependent path measurement sensors, another problem arises. Specifically, when a wheeled unit runs over its supply line, a traveled path segment measured by wheel rotation is falsified. Where such data is used to orient the unit, the unit thereby becomes inaccurately oriented in its environment. Incorrect position data for an obstacle detected by the unit would then be entered in the wrong position on a map serving to orient the unit in its environment.

Since a cable or supply line associated with the unit is located in the area of operation of the mobile system, the cable or supply line must be explicitly taken into account in the path planning. There is a fundamental risk of knotting, although the running over of the cable is also enough to cause errors in the estimation of the position of the mobile robot.

In order to enable the development of travel strategies, information is needed concerning the probable position of the cable on the ground. Another problem is that the actual position of the cable may be arbitrarily altered by environmental influences. Therefore, to prevent problems such as knotting by means of a suitable travel strategy, even over extended use periods, data is needed for estimating the probable position of the cable on the ground.

For these reasons, it is desirable to consider the supply line position data in travel path planning of an autonomous mobile unit. A need exists for an apparatus for determining supply line position and for a method of travel path planning or mapping which utilizes supply line position data for avoiding errors related to the supply line.

SUMMARY OF THE INVENTION

The invention provides a solution to the aforementioned problems by providing a means to measure the exit direction of a supply line from an autonomous mobile unit. From line exit direction, the actual supply line position may be reasonably estimated, particularly where the supply line is kept taut. Exit direction data may then be used in planning the travel path in conjunction with data of the path already traveled, to avoid supply line related errors. Areas of application for such arrangements can include the fields of transport vehicles, industrial cleaning units or household robots.

Therefore, an apparatus according the present invention includes a directional pressure sensing means arranged to measure the direction from which the supply line extends from the autonomous mobile unit.

More specifically, the present invention provides an apparatus, such as a robot or autonomous mobile unit, having a flexible supply line and a system for determining a relative exit direction of the supply line therefrom. The system includes a guide means for guiding the supply line. A directional pressure sensor is provided on the guide means for sensing a pressure exerted by the supply line in a particular direction and emitting a corresponding directional pressure signal. A winding apparatus stores a variable unfed length of the supply line. The winding apparatus senses a degree of winding of the supply line and emits a corresponding winding signal. An evaluation means is provided for evaluating the directional pressure signal emitted by the pressure sensor and determining the exit direction therefrom. The system also includes a control computer for controlling a travel path of the apparatus based on the exit direction, the winding signal, and a movement history of the apparatus, such that the apparatus does not run over the supply line.

The guide means may be a feed-through exit opening formed in a housing. In another embodiment, the guide means could include an extension arm having a first end mounted to the apparatus housing, and a second end on which a cable bushing is secured through which the supply line is guided. In an embodiment, the first end is pivotably mounted to the apparatus, wherein the pressure sensor is located at the pivotal first end. In another embodiment, the pressure sensor may be located at the cable bushing.

In an embodiment, the pressure sensor includes a plurality of microswitches arranged at the guide means to be respectively actuatable when contacted by the taut supply line at a corresponding predetermined exit direction. In another embodiment, the directional pressure sensor is a foil pressure sensor arranged at the guide means.

In an embodiment, the winding apparatus automatically maintains a predetermined tension on the supply line, such as with an electric motor.

Another aspect of the invention provides a method for planning a travel path of an autonomous mobile unit having a flexible supply line. The method includes the step inferring a position of the supply line relative to the unit based on a travel path already traveled by the unit in combination with the exit direction of the supply line. The method also includes planning a further travel path of the unit such that the unit does not run over the supply line.

In an embodiment, the method also includes determining a length of supply line paid out, wherein the planning step permits nearly a maximum length of the supply line to be paid out. In such an embodiment, the planning step may further include moving the unit backwards when the supply line is about fully paid out.

Also according to the invention, an autonomous mobile unit is provided having a system for sensing a relative exit direction of an associated flexible supply line. The system includes an exit opening through which the flexible supply line is feedably guided. This opening may be round, square, octagonal, or any suitable shape. The directional pressure sensor is arranged at least partially around the exit opening to sense pressure at a given point thereon when the supply line contacts the pressure sensor. The sensor emits a signal corresponding to an exit direction of the supply line from the exit opening.

In an embodiment, the directional pressure sensor is a foil sensor which varies in electrical resistance correspondingly with an amount of pressure and along its length. In another embodiment, the foil sensor is bent in a loop shape to extend around an inner periphery of the exit opening.

In another embodiment, the directional pressure sensor includes a plurality of microswitches arranged at predetermined points around said exit opening. A plurality of plates may be arranged so that each plate is disposed to actuate a respective one of the microswitches upon receiving contact pressure from the supply line. The plates are biased by respective springs, and the springs have a selected spring coefficient such that the microswitches are actuated only when the contact pressure exceeds a predetermined threshold pressure.

An advantage of the inventive arrangement is that it expands the use possibilities of a robot or mobile unit having supply lines. In particular, the inventive arrangement helps avoid hindrances of movement from the supply line. The use of the pressure sensing means for the determination of the cable exit direction is a simple and practical constructive measure. The pressure sensed at a particular supply line direction is an important piece of data (besides the cable tension). For example, the position of the cable or supply line at the cable exit may be sensed to the left, right, downward, or upward. Together with travel commands, the line position can be advantageously inferred in this way.

An advantage of the invention is that the directional pressure sensing means may be incorporated as part of the housing of the unit. Little or no additional constructive expense is thereby required, and only the housing of the apparatus must be specially constructed. Otherwise, the directional sensing means may be easily mounted to the housing, requiring little or no housing modification.

In an advantageous embodiment of the invention, the directional pressure sensing means is an extension arm which is mounted to extend from the unit housing to guide the supply line. An advantage of such an embodiment is that the supply line is held clear of movable parts of the apparatus. The extension arm has a pressure or movement sensor preferably arranged at one end of this extension arm. For example, the sensing means may be located where the arm meets the housing, or at an outer end of the arm from which the supply line extends. The extension arm may be movably mounted.

The directional pressure sensing means is preferably arranged to surround an exit point of the supply line, since in this way all possible exit directions of the supply line can be measured in a simple fashion.

In an embodiment, the directional pressure sensing means may include a plurality of microswitches arranged around the supply line outlet. Such an embodiment is advantageous because it is easily implementable.

A further, particularly advantageous embodiment of the pressure sensing or measuring means is a foil pressure sensor. This foil pressure sensor may be flexibly bent into a loop shape, providing a single component adequate to meet all demands placed on the pressure sensing means by the invention.

The inventive arrangement is particularly advantageous in an autonomous mobile unit, avoiding supply line knotting and preventing running over the supply line through use of the line exit direction in the travel path planning of this unit.

It is particularly advantageous to combine the inventive directional sensing arrangement with a cable winding apparatus which maintains a desired degree of tautness on the supply line. This can ensure that the supply line is always guided along the shortest path to the fixed supply point.

An aspect of the invention is also advantageous in that it provides a method for planning a travel path of an autonomous mobile unit which considers the cable exit direction. This method generates travel commands based on input data including the line exit direction data, using a control computer to infer the position of the supply line. The travel path to be planned is such that the supply line is not run over and/or such that supply line knotting is avoided.

The inventive travel path planning method can be used particularly favorably in connection with the automatic supply line winding apparatus equipped with one or more sensors for determining feed length or tension. The winding apparatus sensor provides useable information about a winding state of the supply line which may be used in generating a navel path. For example, the length of supply line paid out can thereby be determined, and a travel path to be planned can be matched to an overall length of the supply line.

Additional features and advantages of the present invention are described in, and will be apparent from, the detailed description of the preferred embodiments and from the drawings.

DETAILED DESCRIPTION OF THE PREFERRED EMBODIMENTS

Figure 1:
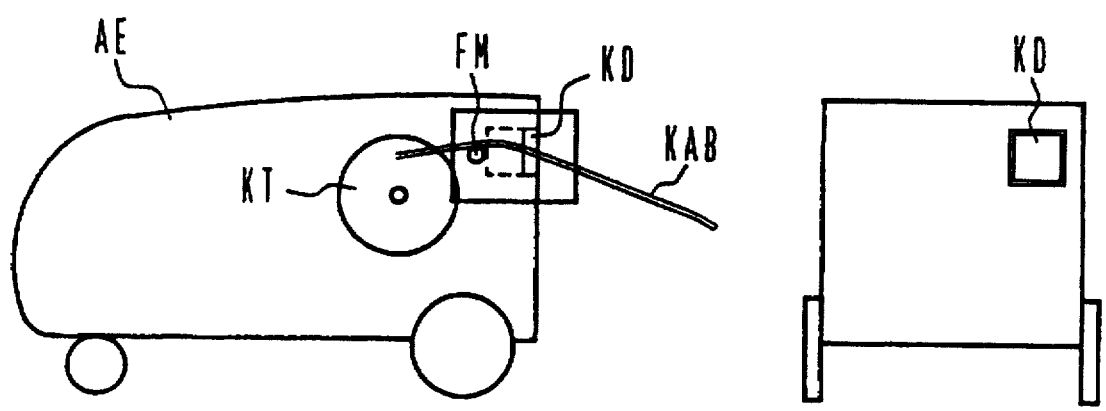
FIG. 1 is a schematic view of an autonomous mobile unit according to an embodiment of the invention.

FIG. 1 illustrates an example of an inventive apparatus, here constructed as an autonomous mobile unit AE. In FIG. 1, a side view of the apparatus is shown at the left, and a back view is shown at right. For example, a cable feed-through opening KD for a cable or supply line KAB is arranged at a rear of the unit AE, as shown, but the opening KD may be located at any other point of the apparatus. Preferably, the supply line KAB is coiled around a cable drum KT, from which the line is guidably fed or retrieved by a guide roller FM. A defined cable position is thereby ensured upon leaving the cable drum, independent of the amount of cable already paid out.

At the end of the cable shaft, there is a sensor arrangement (e.g. a sensor ring) that can record contact with the cable and also the pressure of the contact.

As mentioned, the supply line KAB is guided to the cable drum KT by means of the guide roller FM. The supply line can be reeled on and off the cable drum KT by a motor, for example. Additionally, in an embodiment, the cable drum KT can be provided with means for measuring the tension of the supply line. During motion of the autonomous mobile unit AE, the supply line KAB is rolled on or off of the drum KT, depending on a tension determined at the supply line KAB. Examples of such supply lines KAB include pressure lines, electrical supply lines, or also electronic connection lines, with which for example subsequent autonomous mobile units can be supplied with information.

Figure 2:
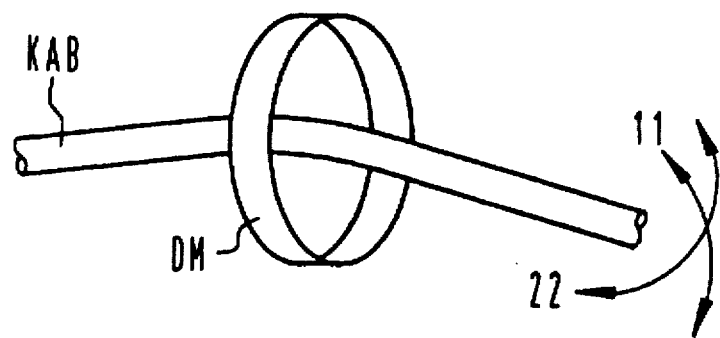
FIG. 2 is a schematic perspective view of a directional pressure sensor according to an embodiment of the invention.

FIG. 2 schematically illustrates an example of a foil-type directional pressure sensor arrangement according to the invention. The supply line KAB is guided through a feed-through opening surrounded by a circularly bent or loop-shaped foil pressure sensor DM. The arrows 11 and 22 indicate the unlimited directions in which the supply line may be moved. The foil pressure sensor DM is loaded at a point of physical contact from the supply line KAB in the direction of the arrow. Motion of the supply line KAB results in a change in the point of pressure against the foil sensor. A signal is sent from the sensor DM to, for example, a control computer of the unit, which infers therefrom a direction of the corresponding motion of the supply line. This foil sensor DM can be realized particularly simply in the form of a foil pressure sensor bent in the shape of a loop, and is commercially available in a standard form.

A foil pressure sensor DM is a tactile sensor that reacts with variable resistance. The firmer the pressure on the thick film lining, the more strongly the resistance falls off. In order to enable the optimal determination of the exit direction of the cable, the contact point and also the contact pressure of the cable must be measured. An embodiment of a foil sensor as a linear potentiometer is optimally suited for this purpose. Such a sensor can measure both the contact point of a force exerted along the pressure-sensitive field and the magnitude of contact pressure. The force can for example be measured from 10 g to 10 kg.

Foil pressure sensors have numerous additional advantages. For instance, foil sensors are very robust and long-lasting. Usually, one is good for at least 10 million trigger-ings. A foil sensor is very inexpensive. Moreover, special productions are easily possible. simple, economical electronics interfaces (resistance can be measured easily via voltage dividers and A/D converters).

The flexible foil sensor is preferably bent into a ring or loop for optimal sensing in any direction. The foil, however, may be bent according to any cable exit opening shape, such as a rectangle. The foil sensor may be easily attached within the cable exit opening, e.g., by adhesive or glue. Since the sensor material is very robust, the supply line can lie and rub against the sensor strip, whereby the contact point and contact pressure can be constantly measured.

Figure 3A:
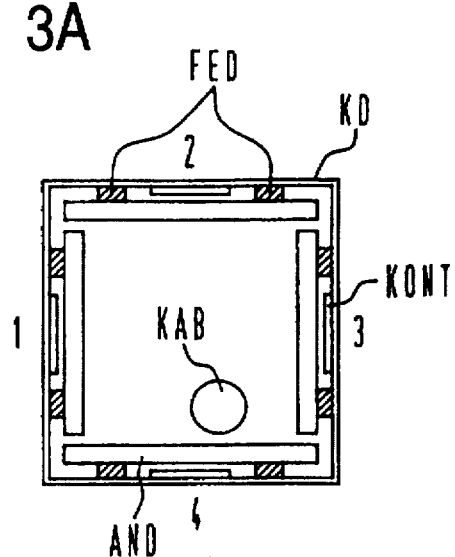
FIGS. 3A and 3B are rear views of respective directional pressure sensors having a plurality of microswitches, as seen looking into a supply line shaft.
Figure 3B:
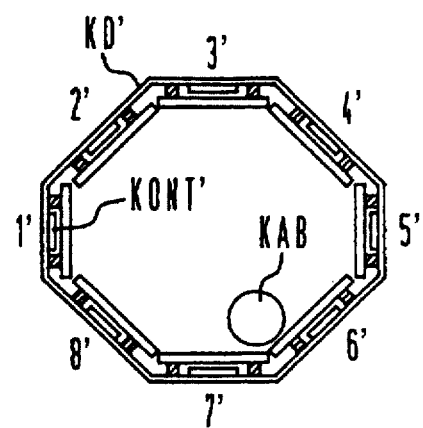

FIGS. 3A and 3B indicate examples of directional pressure sensors, KD and KD', respectively, each of which has an alternative construction including a plurality of microswitches surrounding the supply line. In the embodiment of FIG. 3A, a feed-through exit opening in the sensor KD has a square cross-section. In the sensor KD' of FIG. 3B, the feed-through exit opening is octagonal. It is possible in a particular robot or unit that the supply line KAB would be led only in limited specific directions, wherein it would accordingly be necessary to provide a sensor KD or KD' which only partially surrounds an opening. In other words, the pressure sensor can be arranged at only points expected to be loaded by the supply line KAB during operation of the unit.

The exemplary embodiments of FIGS. 3A and 3B are particularly simple embodiments of reliable directional pressure sensors. These microswitch type sensors have proven themselves in practice, and make possible a broad application in the commercial field as well. In the sensor KD of FIG. 3A, contacts 1–4 are provided, and in the sensor KD' of FIG. 3B, contacts 1'–8' are provided. These contacts are closeable by movement of pressure plates AND. These plates AND are spring-loaded by springs FED.

According to the disposition of the supply line KAB, one or more of the pressure plates AND is loaded, one or more of the springs FED correspondingly give way, and the contact is actuated by the pressure plate. A signal is delivered upon closing of the contact, from which a control unit derives the momentary exit direction of the supply line from the apparatus. Thereby, the approximate position of the supply line can be inferred from the plurality (e.g., 4 or 8) of pressure contacts. For example, if contact 3 of the FIG. 3A embodiment is closed, the supply line KAB is determined to exit the cable shaft to the right. If, for example, the two contacts 3 and 4 are triggered, the supply line is then determined (with great probability) to exit at the lower right.

In the embodiments of FIGS. 3A and 3B, through suitable selection of the spring constants, the pressure at which the contacts are triggered can be set. The number of contacts used determines how precisely the contact point can be determined. With the use of more contacts, the contact point can be determined with considerably greater precision. However, these simple switches have disadvantages in that a fixed triggering "pressure threshold" must be set via the selection of the springs used. Also, the triggering of a simple contact point yields only binary information-whether the pressure threshold has been exceeded or has not yet been exceeded.

Switch embodiments may be provided which are operable to continuously measure a varying degree of pressure at the contact point. For example, potentiometers may be provided at the pressure contacts. These potentiometers could measure the compression of the springs, and thereby the pressure on the pressure contact. The pressure could then be determined via the variable resistance. However, the attachment of mechanical potentiometers is complex and costly. The construction of the sensor apparatus with foil pressure sensors is considerably simpler and more elegant.

In connection with further travel path data of a mobile unit, the position of the line in the environment can be inferred using the length of line paid out and the movement history. The further travel path can be so planned that the cable neither becomes knotted nor is run over. The unit could also be programmed to stop or move backwards if the length of cable paid out has reached its maximum limit.

Figure 4:
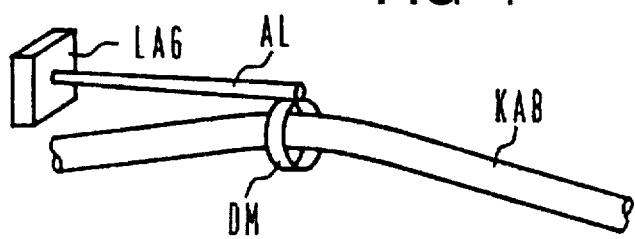
FIG. 4 is a perspective view of a directional pressure sensor embodiment mounted on an extension arm according to an embodiment of the invention.

FIG. 4 illustrates a further embodiment according to the invention. Here, the supply line KAB is led through a pressure recording means DM arranged on an extension arm AL. The extension arm AL is thereby movably positioned in a bearing LAG on the apparatus. This embodiment has the advantage that the supply line can be held clear of movable parts of the apparatus, such as for example other movable machine parts or drive wheels. The pressure recording means DM is shown in FIG. 4 as a foil pressure sensor bent into a loop shape, but the invention is not limited to this. Other known pressure sensors could also be attached to the arm.

Furthermore, embodiments according to the invention are also possible wherein the pressure sensing component is not at the outer end of the extension arm, but rather is located in the arm-to-housing mount bearing LAG. With such an arrangement, the supply line exerts force on the pressure sensor through a lever effect with the extension arm AL. Because of the lever-amplified force, a less sensitive directional pressure sensing device could be used. This arrangement could be attached either in the cable shaft or also possibly outside the cable opening.

Figure 5:
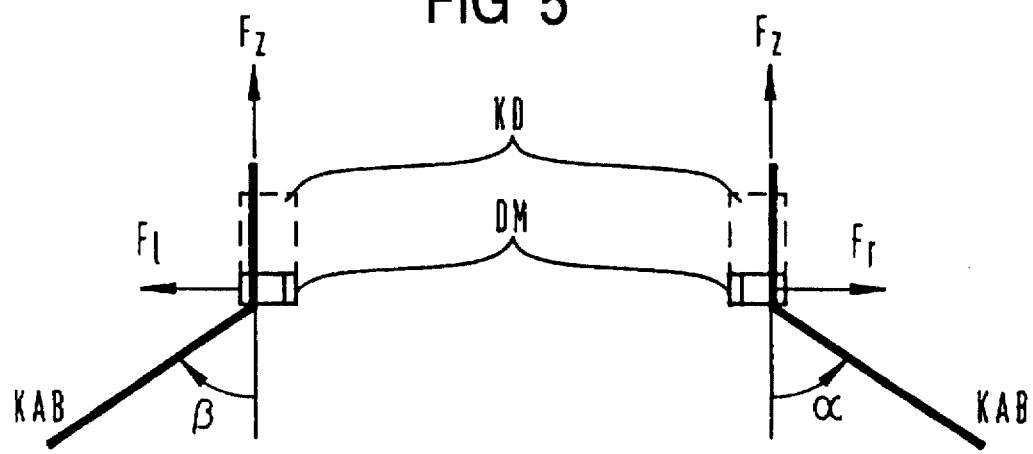
FIG. 5 illustrates two respective plan views of exemplary force vectors that can be determined using the inventive arrangement.

FIG. 5 illustrates two examples of the disposition of a supply line. The supply line KAB is led through a cable feed-through opening KD, in which the directional pressure sensing means DM are schematically represented.

In the one case, the supply line forms the angle β with the apparatus. There arises for example at the cable drum of the apparatus a force $F_z$ to be determined, from which the angle β can be derived through simple trigonometric decomposition of the force, in combination with the pressure measured at the pressure recording means. The cable angles to the left (β) and to the right (α) are easily determined via the relations $F_l=F_z \sin\beta$ and $F_r=F_z \sin\alpha$.

A very precise determination of pressure is possible with the foil pressure sensor. Even the angle at which the supply line leaves the cable shaft can thereby be determined. FIG. 5 shows the two-dimensional case in which, using the proposed sensor apparatus, the cable pressure at the cable exit to the left $F_l$ and to the right $F_r$ can be measured. In addition, it is for example assumed that the cable tension is measured at the cable drum $F_z$.

A decomposition of forces for the angle α, at which the supply line KAB exits to the right from the apparatus, can be carried out in an equivalent manner. For the functioning of the inventive arrangement, it is not essential that the angle be precisely determined. It is also sufficient to determine merely the exit direction of the supply line, since for example the course of the cable exit opening on the travel path can be followed in connection with a travel path planning of the apparatus, in particular of an autonomous mobile unit. Also, in connection with the movement history of the autonomous mobile unit, a precise statement of the probable disposition of the supply line is possible. Since continuous pressure measurement is not possible with mechanical switches as shown in FIG. 3, the approximate cable direction can for example be determined via the following allocation table:

| Contacts | Direction |
|---|---|
| 1 | left |
| 1, 2 | top left |
| 2 | top |
| 2, 3 | top right |
| 3 | right |
| 3, 4 | bottom right |

-continued

| Contacts | Direction |
|---|---|
| 4 | bottom |
| 4, 1 | bottom left |
| none | cable is stretched so that it does not touch the sensor apparatus |

If the supply line is not touching the sensor ring, the probable supply line position depends on several factors, including, for example, cable tension, position of the cable guide, shape of the cable shaft or height of the plug outlet into which the supply line is plugged. A probable cable position is one in which the cable is stretched by tension.

Various changes and modifications to the presently preferred embodiments will be apparent to those skilled in the art. Such changes may be made without departing from the spirit and scope of the present invention and without diminishing its attendant advantages. For example, the present invention could foreseeably be used in stationary machines. Therefore, the appended claims are intended to cover such changes and modifications.

What is claimed is:

1. An apparatus having a flexible supply line and a system for determining a relative exit direction of the supply line therefrom, the system comprising:
   a) guide means for guiding the supply line;
   b) directional pressure sensor on the guide means for sensing a pressure exerted by the supply line in a particular direction and emitting a corresponding directional pressure signal;
   c) a winding apparatus for storing a variable unfed length of the supply line, the winding apparatus sensing a degree of winding of the supply line and emitting a corresponding winding signal;
   d) evaluation means for evaluating the directional pressure signal emitted by the pressure sensor and determining said exit direction therefrom; and
   e) a control computer for controlling a travel path of the apparatus based on the exit direction, the winding signal, and a movement history of the apparatus, such that the apparatus does not run over the supply line.

2. The apparatus according to claim 1, wherein the guide means is a feed-through exit opening.

3. The apparatus according to claim 1, further comprising an extension arm having a first end which is pivotably mounted to the apparatus, and a second end having a cable bushing through which said supply line is guided.

4. The apparatus according to claim 3, wherein the directional pressure sensor is arranged at one of the two ends.

5. The apparatus according to claim 1, wherein the pressure sensor surrounds the supply line.

6. The apparatus according to claim 1, wherein the pressure sensor includes a plurality of microswitches arranged to be respectively actuatable when contacted by the supply line at a corresponding predetermined said exit direction.

7. The apparatus according to claim 1, wherein the directional pressure sensor is a foil pressure sensor.

8. The apparatus according to claim 1, wherein the apparatus is an autonomous mobile unit.

9. The apparatus according to claim 1, wherein the winding apparatus automatically maintains a predetermined tension on the supply line.

10. A method for travel path planning of an autonomous mobile unit having a flexible supply line, the method comprising the steps of:

inferring a position of the supply line relative to the unit based on a travel path already traveled by the unit in combination with the exit direction of the supply line; and planning a further travel path of the unit in such a way that the supply line having an inferred position is not thereby run over.

11. The method according to claim 10, further comprising:

determining a length of supply line paid out;

wherein the planning step permits nearly a maximum length of the supply line to be paid out.

12. The method according to claim 11, wherein the planning step includes:

moving the unit backwards when the supply line is about fully paid out.

13. An autonomous mobile unit having a system for sensing a relative exit direction of an associated flexible supply line, the system comprising:

an exit opening through which the flexible supply line is feedably guided;

a directional pressure sensor arranged at least partially around said exit opening to sense pressure at a point thereon when said supply line contacts said pressure sensor, said sensor emitting a signal corresponding to an exit direction of the supply line from the exit opening.

14. The autonomous mobile unit according to claim 13, wherein said pressure sensor is a foil sensor which varies in electrical resistance correspondingly with an amount of pressure and along its length.

15. The autonomous mobile unit according to claim 14, wherein the foil sensor is bent in a loop shape to extend around an inner periphery of the exit opening.

16. The autonomous mobile unit according to claim 13, wherein said exit opening is round.

17. The autonomous mobile unit according to claim 13, wherein said pressure sensor comprises:

a plurality of microswitches arranged at predetermined positions around said exit opening, the microswitches being respectively actuatable by pressure from said supply line.

18. The autonomous mobile unit according to claim 17, wherein said pressure sensor further comprises:

a plurality of plates, each plate being disposed to actuate a respective one or more of said microswitches upon receiving contact pressure from said supply line.

19. The autonomous mobile trait according to claim 18, wherein said plates are biased by respective springs, said springs having respective spring coefficients selected such that said microswitches are actuated only when said contact pressure exceeds a predetermined threshhold pressure.

20. the autonomous mobile unit according to claim 13, further comprising:

a winding apparatus to automatically feed and retrieve said supply line to maintain a desired level of tautness in the supply line.

* * * * *